United States Patent [19]

Hartwig et al.

[11] 4,386,020
[45] May 31, 1983

[54] PROCESS FOR THE PRODUCTION OF THERMODYNAMICALLY STABLE SOLID ION CONDUCTOR MATERIALS

[75] Inventors: Peter Hartwig, Weinheim; Werner Weppner, Stuttgart; Winfried Wichelhaus, Ingelheim am Rhein, all of Fed. Rep. of Germany

[73] Assignee: Max Planck Gesellschaft zur Förderung der Wissenschaften E.V., Göttingen, Fed. Rep. of Germany

[21] Appl. No.: 145,638

[22] Filed: May 1, 1980

[30] Foreign Application Priority Data

May 10, 1979 [DE] Fed. Rep. of Germany ....... 2918940

[51] Int. Cl.$^3$ ............................................. H01B 1/06
[52] U.S. Cl. .................... 252/518; 252/500; 423/299; 423/300; 423/301; 423/302; 423/303; 423/351; 423/617; 429/218
[58] Field of Search .................... 252/518, 500, 182.1; 423/383, 371, 351, 617, 413, 300, 301, 302, 303, 299; 136/89 AA, 89 ST, 238, 240; 204/94; 429/218

[56] References Cited

U.S. PATENT DOCUMENTS

| | | | |
|---|---|---|---|
| 3,957,696 | 5/1976 | van Lier et al. | 423/383 |
| 4,172,115 | 10/1979 | Hulme | 423/300 |
| 4,176,170 | 11/1979 | Kasper et al. | 252/518 |
| 4,184,015 | 1/1980 | Reau et al. | 252/518 |
| 4,206,088 | 6/1980 | Inoue et al. | 252/518 |
| 4,211,475 | 7/1980 | Malugani et al. | 252/518 |
| 4,276,343 | 6/1981 | Cremer et al. | 423/300 |
| 4,321,163 | 3/1982 | Wahl et al. | 252/518 |

FOREIGN PATENT DOCUMENTS

5511629 3/1979 Japan ................................. 252/500

*Primary Examiner*—J. L. Barr
*Attorney, Agent, or Firm*—Felfe & Lynch

[57] ABSTRACT

The present invention provides a process for the production of solid ion conductor materials (electrolytes) based on lithium or sodium compounds which stand in thermodynamic equilibrium with their alkali metal and have a high decomposition voltage, wherein two or more binary lithium or sodium compounds with an anion which is formed from one or more elements of the group consisting of nitrogen, phosphorus, arsenic, oxygen, sulphur, selenium, tellurium, hydrogen, fluorine, chlorine, bromine and iodine and which stand in thermodynamic equilibrium with their alkali metal are reacted together in such amounts and for such a period of time that a radiographically phase-pure product is formed.

The present invention also provides ion conductor materials based on lithium or sodium compounds, which have the general formula:

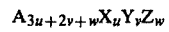

$$A_{3u+2v+w}X_uY_vZ_w$$

wherein A is lithium or sodium, X is nitrogen, phosphorus and/or arsenic, Y is nitrogen, sulphur, tellurium and/or selenium, Z is hydrogen and/or halogen and u, v and w each represent a number of from 0 to 1 inclusive, with the proviso that only one of u, v and w can assume the value of 0. Furthermore, the present invention provides galvanic cells comprising at least one of these ion conductor materials.

4 Claims, 4 Drawing Figures

PROCESS FOR THE PRODUCTION OF THERMODYNAMICALLY STABLE SOLID ION CONDUCTOR MATERIALS

This invention relates to a process for the production of solid lithium and sodium ion conductor materials. In addition, the invention provides new lithium or sodium ion conductor materials obtainable by this process and in additional aspect relates to the use of such materials in galvanic cells.

In commercial utilization, the alkali metals lithium and sodium are especially preferred as solid ion conductors. Because of the low equivalent weight and of the strongly electropositive character of these metals, galvanic cells can be produced which display a favourable relationship between the stored energy and the weight of the cell. With equivalent conductivity and thermodynamic stability, the lithium compounds are preferred to the sodium compounds.

Ion conductors for use in galvanic cells should fulfill the following conditions:
(1) high ionic conductivity with comparatively low electronic conductivity,
(2) thermodynamic stability towards electrode materials with high lithium or sodium activity and
(3) a thermodynamic decomposition voltage as high as possible.

During recent years, the search for new ion conductor materials always places condition (1) in the foreground. Na-$\beta$-Al$_2$O$_3$ and Li-$\beta$-Al$_2$O$_3$ were the first compounds of a series of metallates, silicates and phosphates of sodium and lithium for which a high ion conductivity was found. These compounds have an open crystal structure which provides the Na$^+$ and Li$^+$ ions with a sufficient number of defects (vacancies or interstitials) for ion conduction. An increase of the defects and an improvement of the conductivity thereby provided was achieved by substitution of the monovalent alkali metal ions by higher valency cations, for example, Zn$^{2+}$ or Mg$^{2+}$ cations.

Although, under these structural aspects, a plurality of ion-conducting compounds could be produced, the number of useful ion conductor materials remained small since condition (2), i.e. thermodynamic stability towards the electrode materials, was not fulfilled by most of these compounds. Thus, in particular, many lithium ion conductors, for example Li-$\beta$-Al$_2$O$_3$ and Li$_{14}$Zn(GeO$_4$)$_4$, are not stable towards lithium anodes. The instability can thereby be due to a decomposition reaction of lithium with the complex anion, for example with GeO$_4^{4-}$, and/or with the doping cation, for example Zn$^{2+}$.

For the use of solid ion conductor materials in primary and secondary energy storage batteries, condition (3), i.e. a high thermodynamic decomposition voltage, is a further important prerequisite since the electrodes must differ distinctly in the activity of the component which is electrochemically transmitted (lithium or sodium). Therefore, transitional metal oxides or sulphides are preferred as cathodes. The decomposition voltage of the ion conductor should thereby be at least 2 V. However, this condition is also not fulfilled by many known ion conductors. Known materials which stand in thermodynamic equilibrium with lithium or sodium and thereby display a high decomposition voltage are, in particular, binary compounds of these alkali metals with those elements which have a high electro-negativity. However, the ion conductivity of these compounds and especially of the oxides and halides, for example lithium oxide, lithium fluoride and lithium chloride, is very low ($\sigma_{ionic}$, 25° C. $<10^{-8}\Omega^{-1}$cm$^{-1}$) at technically usable temperatures because of an insufficient number of defects.

Therefore, it is an object of the present invention to provide a process for the production of solid ion-conducting lithium or sodium compounds which better fulfil the three above-mentioned conditions than the previously known ion conductors and which, in addition to a high ion conductivity, have a high thermodynamic stability towards electrode materials and especially towards lithium and sodium and have a high decomposition voltage. Another object of the present invention is to provide new ion-conducting lithium and sodium compounds with the above-mentioned properties. Finally, it is an object of the present invention to provide galvanic cells which contain the solid ion-conducting materials according to the present invention.

Thus, according to the present invention, there is provided a process for the production of solid ion conductor materials (electrolytes) based upon lithium or sodium compounds which stand in thermodynamic equilibrium with their alkali metal and have a high decomposition voltage, wherein two or more binary lithium or sodium compounds with an anion which is formed from one or more elements of the group consisting of nitrogen, phosphorus, arsenic, oxygen, sulphur, selenium, tellurium, hydrogen, fluorine, chlorine, bromine and iodine and which stand in thermodynamic equilibrium with their alkali metal are reacted together in such amounts and for such a period of time that a radiographically, phase-pure product is formed.

By means of the reaction according to the present invention of two or more binary lithium or sodium compounds which stand in thermodynamic equilibrium with the alkali metal in question, ion-conducting compounds are formed which, in all, better fulfill the requirements for ideal ion conductors than the starting compounds.

The present invention also provides new ion conductor materials based upon lithium or sodium compounds, which have the general formula:

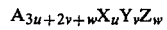

wherein A is lithium or sodium, X is nitrogen, phosphorus and/or arsenic, Y is oxygen, sulphur, tellurium and/or selenium, Z is hydrogen and/or halogen and u, v and w each represent a number of from 0 to 1 inclusive, with the proviso that only one of u, v and w can assume the value of 0.

According to the present invention, X, Y and Z can also signify mixtures of the elements represented by these symbols.

Preferred compounds of the above general formula have the general formulae Li$_{4-x}$NHal$_{1-x}$, wherein $0 \leq x \leq 1$, and Li$_{4-3x}$N$_{1-x}$Hal, again wherein $0 \leq x \leq 1$.

The reaction according to the present invention of binary lithium or sodium compounds can either give a compound which has a crystal structure differing from that of the starting compounds or can give a substitution compound in which the crystal structure of a starting compound is retained. Both possibilities are explained in the following, using lithium compounds as an example. Because of their similar physical-chemical properties, the corresponding sodium compounds behave in an analogous manner.

It is assumed that the present invention can be explained by the following thermodynamic considerations, in conjunction with the accompanying drawings, in which.

Figure 1:
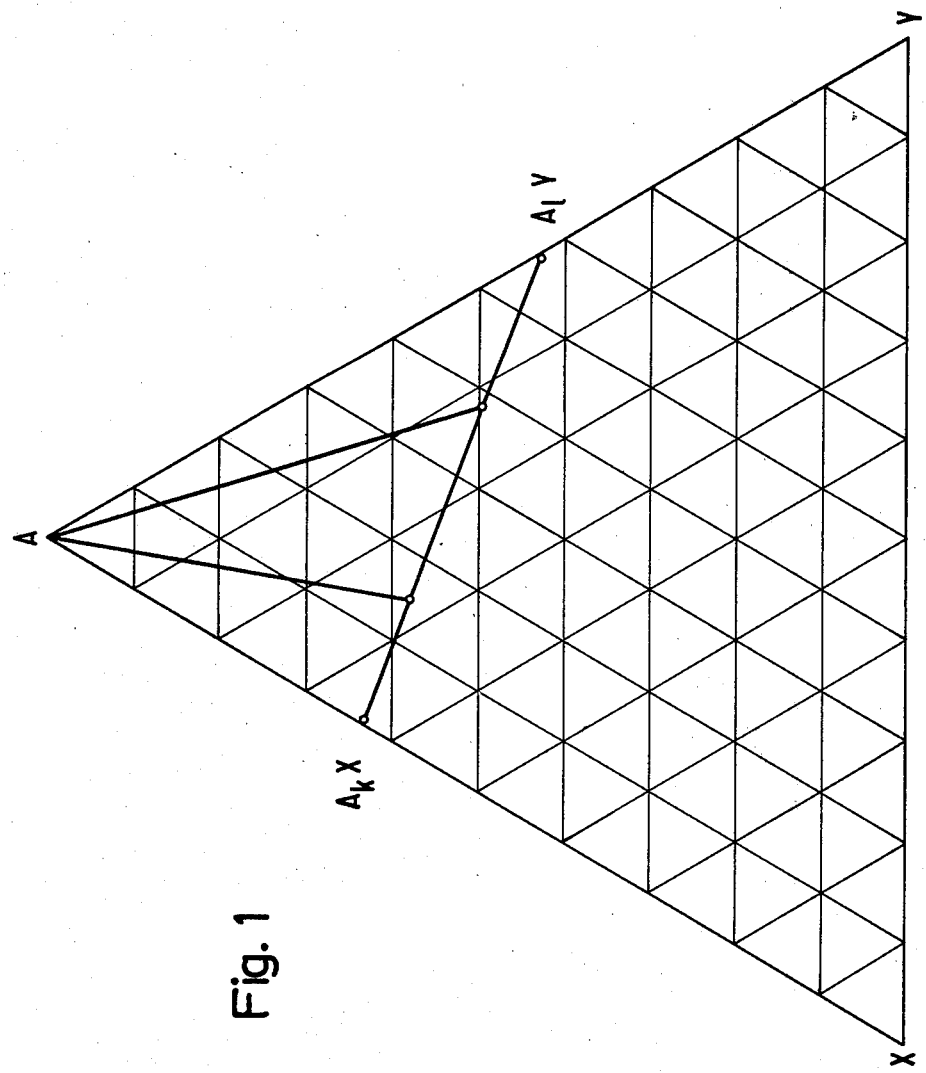
FIG. 1 is the ternary phase diagram of the system A-X-Y.
Figure 2:
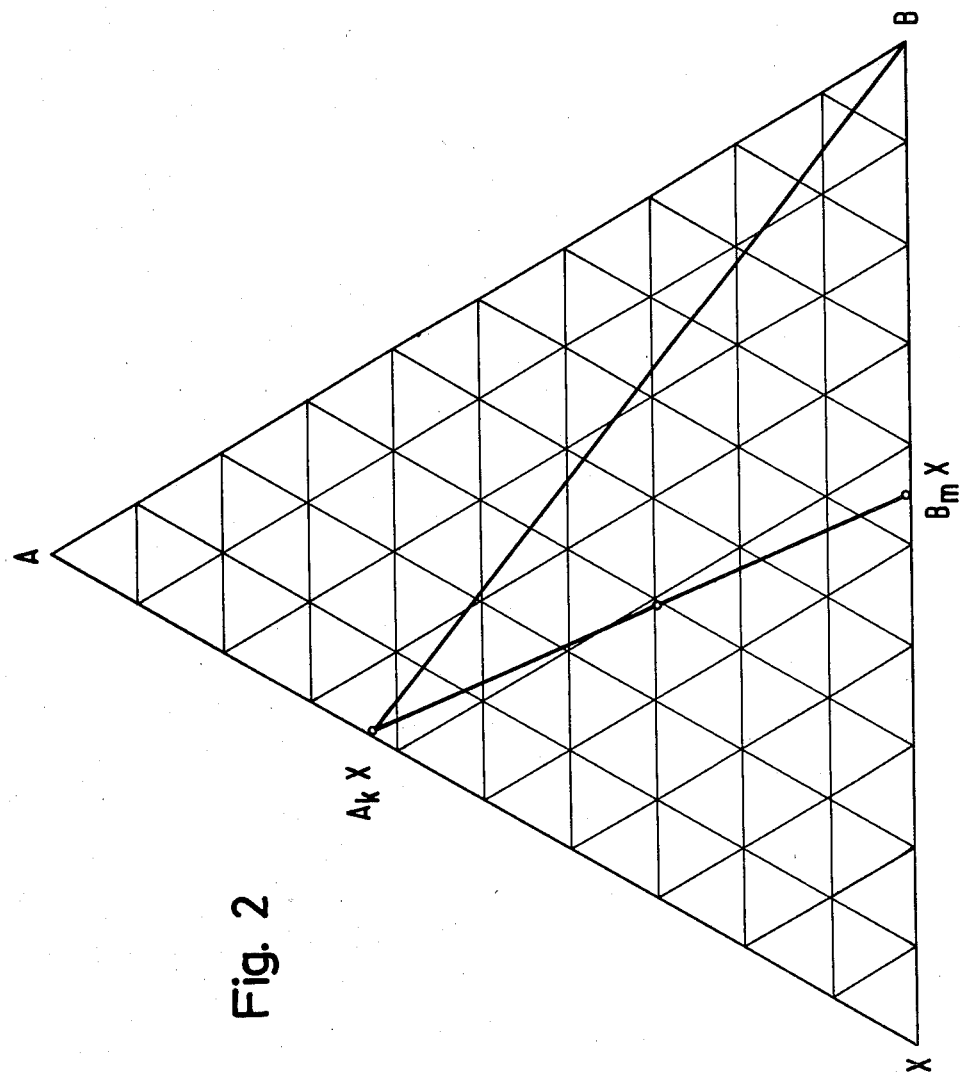
FIG. 2 is the phase diagram of the previously generally undertaken substitution of A by another cation B.

In the ternary phase diagram of the system A-X-Y illustrated in FIG. 1 of the accompanying drawing, $A_kX$ and $A_lY$ are the A-richest compounds of the binary systems A-X and A-Y. Both stand thermodynamically in equilibrium with A. The compounds according to the present invention lie on the quasi-binary section $A_kX$—$A_lY$. These also stand in equilibrium with the pure component A when no phase richer in A exists in the triangle A-$A_kX$-$A_lY$, which, for the here considered alkali metals, has hitherto not been observed. Condition (2) is thus fulfilled. The same consideration applies when the element Z is present instead of X or Y or this is additionally taken up. In contradistinction thereto (FIG. 2), the thermodynamic stability cannot be achieved with the previously generally undertaken substitution of A by another cation B if the alkali metal compound $A_kX$ has a stronger negative Gibbs' formation energy than the introduced phase $B_mX$. In this case, there is a two-phase equilibrium between $A_kX$ and B which separates the 3-phase areas A, $A_kX$, B and $A_kX$, $B_mX$, B from one another so that the new ternary phase formed does not stand in equilibrium with A.

Each of the phases formed between $A_kX$ and $A_lY$ has a higher decomposition voltage than the smallest one of the two binary systems since otherwise it would not result in the formation of the ternary compound or in the solubility. This can be seen from the fact that lines exist in the Gibbs triangle always starting from A which first cut the three-phase area with lowest A activity standing in equilibrium with $A_kX$ or $A_lY$ or an area with still lower activity before they pass the three-phase area standing in equilibrium with the new phases (W. Weppner, Chen Li-chuan and W. Piekarczyk, Z. Naturforsch, 35a (1980), to be published.

The closer the ternary phase lies to the thermodynamically more stable phase, then the higher is its decomposition voltage. In this way, the above requirement (3) for a practically usable solid ion conductor is fulfilled since the decomposition voltage exceeds, in each case, the binary phase which is thermodynamically the least stable. In this way, even with compounds of low stability, ternary phases with much higher decomposition voltage can be obtained as, for example in the case of $Li_{1.8}N_{0.4}Cl_{0.6}$ (P. Hartwig, W. Weppner and W. Wichelhaus, Mat. Res. Bull., 14 (4), 1979).

Since the high defect concentration necessary for high ion conducting is not fulfilled in the previously known binary phases, in the scope of the present invention, the defects are produced by the solubility of a compound with an anion of different valency or by the formation of structurally different ternary phases. In the case of substitution with another anion, about the same defect concentrations are achieved as were previously achieved only by the exchange of the cations. In this way, condition (1) is also fundamentally fulfilled for a suitable solid ion conductor material. For the formation of new phases, there can, as already mentioned above, also be selected anions of the same valency if a structural formation of holes results.

According to a preferred embodiment of the present invention, the first binary compound used is lithium nitride and the second binary compound is lithium chloride, lithium bromide or lithium iodide or a mixture thereof. Within the scope of the present invention, the ternary compounds lying on the quasi-binary sections $Li_3N$-$LiCl$, $Li_3N$-$LiBr$ and $Li_3N$-$LiI$ prove to be especially suitable solid ion conductor materials with regard to the fulfilment of conditions (1) to (3). From Naturwiss., 51, 534/1964, there are known the compounds $Li_9N_2Cl_3$, $Li_{11}N_3Cl_2$, $Li_6NBr_3$, $Li_{13}N_4Br$, $Li_5NI_2$ and $Li_{10-3x}N_{3-x}I$ ($0 \leq x \leq 1$) and their production, as well as, in some cases, their crystal structure. However, the process according to the present invention, which makes possible the general production of stable, solid ion conductors with high decomposition voltage, cannot be deduced from this literature reference.

According to a further preferred embodiment of the present invention, the first binary lithium compound used is lithium oxide and the secondary binary lithium compound with other anions is lithium hydride, lithium fluoride, lithium chloride, lithium bromide or lithium iodide. In this case, it is a question of substitution compounds in which there is present a solubility up to a certain proportion in solid lithium oxide. The so obtained compounds are also especially suitable ion conductor materials according to conditions (1) to (3). The dissolved proportion thereby depends not only on the dissolving lithium compound but also upon the dissolved lithium compound. This applies analogously to the corresponding sodium compounds.

According to a preferred embodiment of the process of the present invention, lithium nitride and lithium halide are intimately mixed in the molar proportion corresponding to the desired composition, under an inert gas, the mixture is pressed under a pressure of at least 50 MPa, the pressed bodies are rapidly heated in an atmosphere of nitrogen to a temperature of from 460° to 550° C. and thereafter annealed at a temperature of from 200° to 550° C. until the reaction is finished. In the case of lithium chloride, it is preferable to anneal at 350° to 450° C., in the case of lithium bromide it is preferable to anneal at 330° to 430° C. and in the case of lithium iodide it is preferable to anneal at 200° to 350° C. Within the here given ranges, the annealing temperature in the case of the lithium halide-rich compounds, especially in the case of lithium iodide, is preferably lower than in the case of the lithium nitride-rich compounds.

In an especially preferred embodiment of this process, lithium nitride is simultaneously produced, as one of the binary starting components, in situ from the constituent elements in a kind of "one-pot" reaction. Lithium halide and lithium metal are hereby mixed in the desired molar ratio and heated under nitrogen until the nitrogen pressure remains constant. Subsequently, as described above, pressing, heating and annealing are carried out. When, instead of lithium nitride, lithium oxide is employed and solid solutions or compounds of lithium halide or lithium hydride in lithium oxide are to be produced, the procedure is similar to that described above for lithium nitride and lithium halide as binary compounds. In this case, lithium oxide and lithium halide and/or lithium hydride are intimately mixed under an inert gas in the molar proportions corresponding to the desired composition, the mixture is pressed under a pressure of at least 50 MPa and the pressed body is subsequently heated at a temperature which is 10° to 150° C. below the melting point of the lowest melting binary component until the reaction is ended.

According to the present invention, the lithium halides are to be understood to be lithium fluoride, lithium chloride, lithium bromide and lithium iodide or mixtures thereof, the same applying to the corresponding sodium compounds.

The pressure employed for pressing the mixture of lithium nitride and lithium halide can have any technically suitable value above the given lower limiting value, pressures of from about 90 to about 120 MPa being preferred. The length and temperature of the heat treatment depend upon the pressure employed. If the nitrogen pressure or the inert gas pressure corresponds to the external pressure, i.e. an elevated pressure is not employed, then the reaction normally takes about 15 to 25 hours, although the reaction times can also be shorter or longer. The end of the reaction can be ascertained when the reaction product is found to be radiographically phase-pure. The period of the heat treatment hereby to be employed at the various usable temperatures can easily be ascertained by simple preliminary experiments.

At an elevated pressure, the period and/or temperature of the heat treatment can be reduced. Therefore, in general, the reaction at an elevated pressure can be carried out in a period of time of from 5 to 120 minutes, using a temperature of from about 100° to 430° C. This embodiment of the process according to the present invention can be carried out, for example, in a pressure sinter press (hot press). Pressed bodies of any desired form can thereby be obtained, for example, tablets, crucibles, tubes, plates and the like.

The embodiment of the process according to the present invention in which a mixture of metallic lithium and lithium halide is heated with nitrogen can be carried out at a temperature of from about 150° to 500° C., a temperature range of from 180° to 230° C. being preferred. The nitrogen partial pressure should be from 1 to 100 KPa. The nitrogen can be used in pure form or mixed with an inert gas. The end of the reaction can be recognised when no further nitrogen is taken up, i.e. the nitrogen pressure remains constant.

The present invention also provides a process for the production of solid ion conductor materials in the form of very thin layers, wherein either (a) the binary lithium or sodium compounds are vapour deposited in the desired molar ratios on to an electrode material of lithium or sodium metal or on to an alloy or inter-metallic compound thereof and reacted by heating, or (b) lithium or sodium or a lithium- or sodium-containing electrode is reacted with a gas mixture of $H_2$, $O_2$, $N_2$, $F_2$, $Cl_2$, $Br_2$, $I_2$ or $H_2O$, $H_2S$, $H_2Se$, $H_2Te$, $NH_3$, $PH_3$, $AsH_3$, HF, HCl, HBr, HI or with a solution of these gases, or (c) electrochemical depositions or decomposition reactions which lead to the formation of the binary compounds are carried out on lithium or sodium or on lithium-containing or sodium-containing electrodes.

This embodiment of the present invention is especially advantageous because, in most cases, a technical utilization of the compounds of the present invention, characterized by their stability towards alkali metals, as well as by the high decomposition voltage, usually necessitates the use of thin layers of these compounds.

The electrode material can consist of the alkali metal itself or of alloys or intermetallic compounds. The electrodes can have any desired shape, for example cylindrical, plate-shaped or crucible-shaped. When carrying out this embodiment of the process according to the present invention with the use of solutions, the solvents used can be organic liquids which do not react with lithium or sodium or with the gases in question. Examples of such solvents include benzines, light oils (alkanes), benzene, ethers, such as tetrahydrofuran, and propylene carbonate. One example of an electrochemical deposition and decomposition reaction is the electrolytic decomposition of a sodium or lithium salt solution, for example lithium chloride in propylene carbonate solution, a lithium chloride layer hereby being deposited on a lithium electrode (anode). However, other solvents, for example, those mentioned above, can here also be used provided that they can dissolve the alkali metal salts.

According to a special embodiment of this variant of the process according to the present invention, the thin layer is applied to a ceramic carrier material which is preferably also in the form of a plate or layer. In this way, a laminar compound material is obtained which can be arranged directly between the electrodes in galvanic cells. The ceramic carrier material thereby has the function of mechanically stabilizing the galvanic cell. The ceramic material must not stand in thermodynamic equilibrium with the electrodes. It can itself have not only an ionic but also an electron conductivity. Insofar as the ceramic material is not itself an ion conductor, it must be porous. Electron-conducting or mixed-conducting ceramics can also be employed, for example graphite felt. Other ceramic materials which can be used include metallates, silicates and phosphates, as well as other oxidic materials. Conventional ceramics can also be used insofar as they are thermodynamically stable against solid electrolytes.

Those laminar materials which have at least one layer of an ion conductor material according to the present invention and a layer of ceramic material can, apart from by the above-described method of direct layer-formed production of the material, also be produced from the ternary materials obtained by heating and annealing of pressed bodies by vapor depositing or melting the latter to produce a dense coating on the ceramic.

Figure 3:
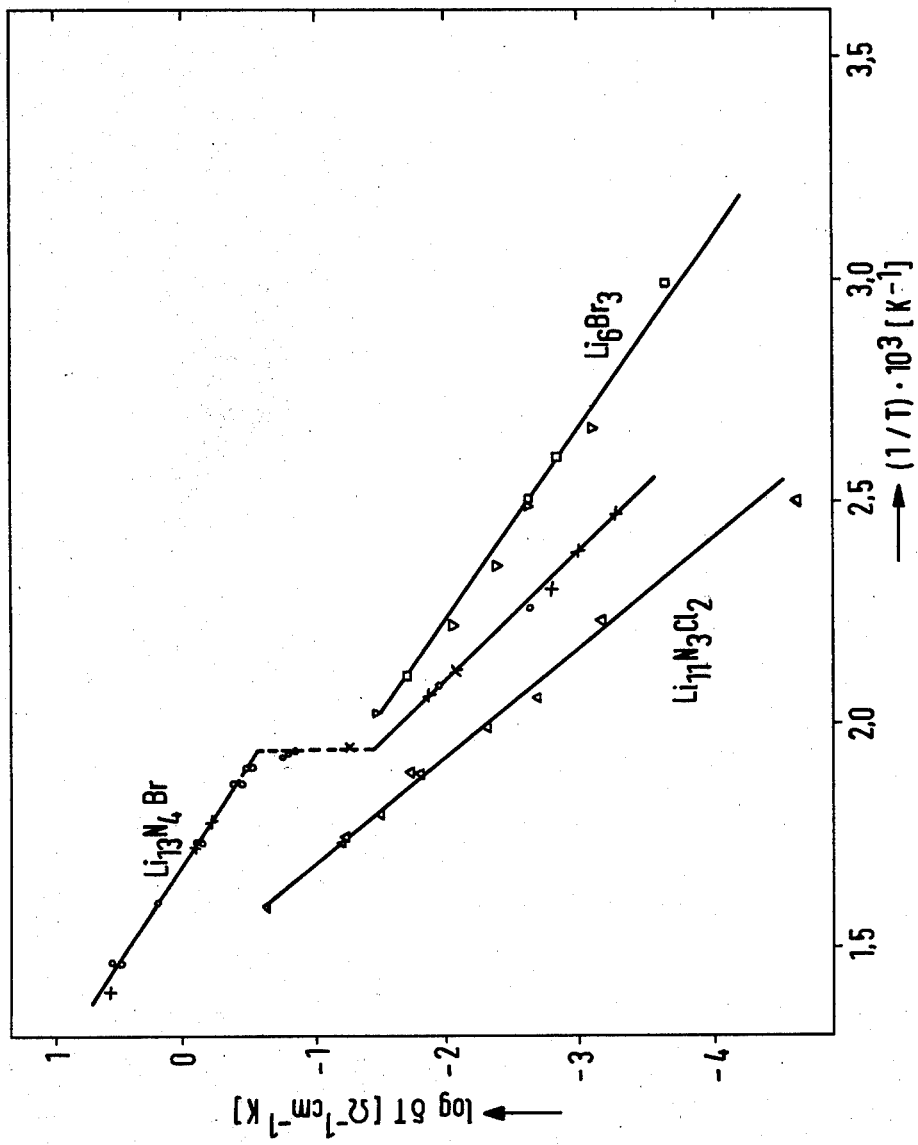
FIG. 3 is a conductivity diagram for some of the ion conductors according to the present invention.
Figure 4:
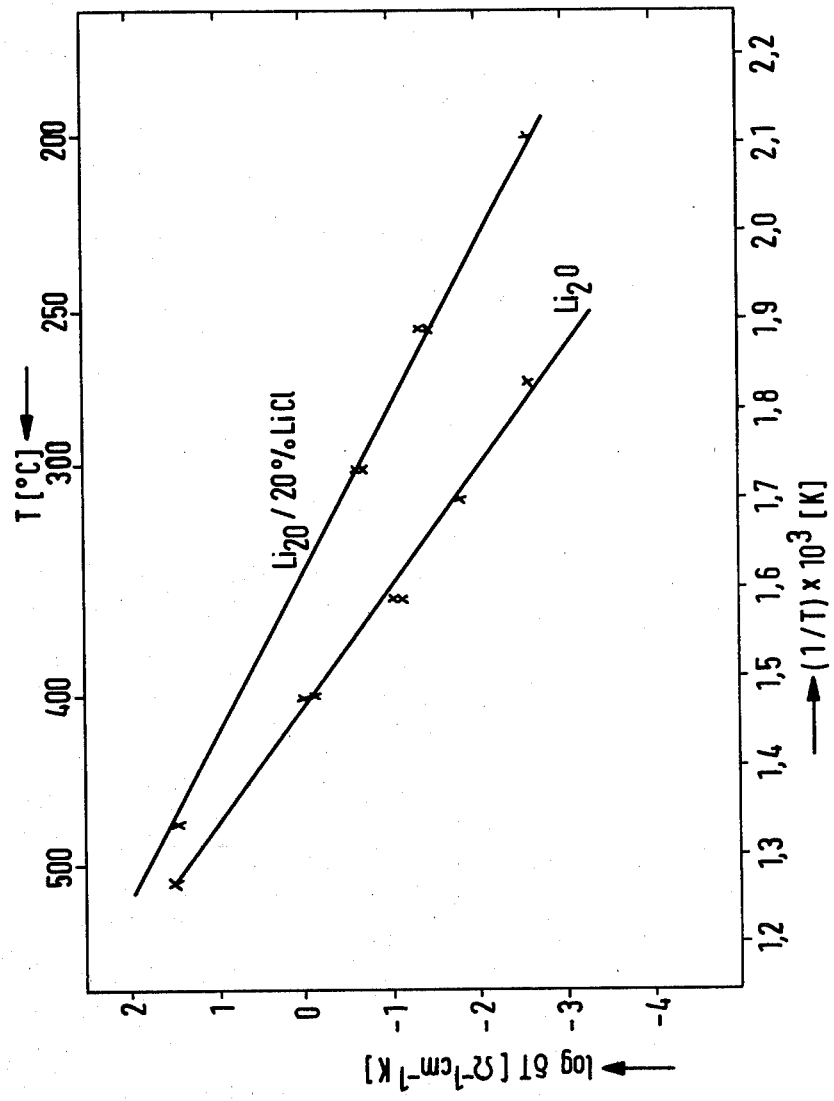
FIG. 4 is a conductivity diagram for another ion conductor according to the present invention and for its binary starting compound.

The conductivities were measured in the temperature range of from 25° to 550° C. on ion conductors according to the present invention, the results obtained being illustrated in FIGS. 3 and 4 of the accompanying drawings. For $Li_{13}N_4Br$, there is given from FIG. 3 an ionic conductivity of $1.4 \times 10^{-3} \Omega^{-1} cm^{-1}$ at 300° C. At about 220° C., a phase change takes place. $Li_6NBr_3$ shows at 100° C. an ionic conductivity of $2 \times 10^{-6} \Omega^{-1} cm^{-1}$ and $Li_{11}N_3Cl_2$ shows at 350° C. a conductivity of $3.5 \times 10^{-4} \Omega^{-1} cm^{-1}$. In the case of all compounds, the electron conductivity over the whole temperature range is smaller at least by a factor of $10^4$.

The influence which is exerted on the conductivity by substitution of a divalent anion by a monovalent anion is explained in FIG. 4, using the example of the lithium oxide-lithium chloride system. Whereas the conductivity of lithium oxide at 250° C. is $1.5 \times 10^{-6} \Omega^{-1} cm^{-1}$, in the case of a sample with 20% lithium chloride, which also crystallizes in the lithium oxide structure, at this temperature the conductivity is $6 \times 10^{-5} \Omega^{-1} \text{cm}^{-1}$.

The solid ion conductor material according to the present invention is especially suitable for use as an electrolyte in galvanic cells, for example in primary or secondary batteries, electrochromic indicators (display systems), timers and memory elements. Therefore, the present invention also provides a galvanic cell containing the solid ion conductor materials according to the present invention or obtainable according to the present invention, the ion conductor material hereby being arranged between electrodes. A galvanic cell of this kind has at least one lithium- or sodium-emitting electrode, for example, metallic lithium or sodium or a lithium or sodium alloy or an intermetallic compound, as well as at least one further positive electrode which, for example, can be of sulphided titanium or molybdenum.

The following Examples are given for the purpose of illustrating the present invention:

EXAMPLE 1

20 Mol.% lithium bromide and 80 Mol % lithium nitride were intimately mixed under an inert gas with the formation of a mixture with the sum composition $Li_{13}N_4Br$. The mixture was pressed at a pressure of 100 MPa to give tablets of 10 mm. diameter and 2 to 5 mm. thickness. The tablets were placed into a molybdenum container and annealed in an atmosphere of nitrogen. For this purpose, they were first heated up rapidly to 450° C. and thereafter annealed for 20 hours at 380° C. with maintenance of the atmosphere of nitrogen. Hard sintered tablets were obtained which can be stored without change in dry air.

In analogous manner, $Li_{11}N_3Cl_2$ and $Li_6NBr_3$ were prepared with appropriate change of the starting compounds and their composition. In this case, the temperature used was 425° and 330° C., respectively.

EXAMPLE 2

20 Mol.% lithium chloride and 80 Mol.% lithium oxide were intimately mixed under an inert gas. The mixture was pressed at a pressure of 100 MPa to give tablets of 10 mm. diameter and 2 to 5 mm. thickness. The tablets were placed in a tungsten container and annealed for 30 hours at 513° C. Hard sintered tablets were obtained which can be stored in dry air.

EXAMPLE 3

Fine-grained lithium iodide and pieces of lithium were vigorously stirred in a mole ratio of 2:3 under an atmosphere of nitrogen of 1 bar pressure in a stainless steel vessel in an oil suspension at temperatures of 100° to 200° C. The consumption of nitrogen was controlled during the reaction via the gas pressure. The remaining constant of the nitrogen pressure indicated the end of the reaction. The oil was removed by decanting and washing out with benzine. An intimate mixture of lithium iodide and lithium nitride remained which, by annealing at 350° C., was converted into $Li_5NI_2$.

EXAMPLE 4

A disc was cut from a lithium metal rod (commercial form). This was exposed in a glass tube to a current of argon to which oxygen and chlorine were admixed in a mole ratio of 9:1. On the lithium surface, there formed a thin coating layer of lithium oxide with dissolved lithium chloride. For homogenizing, the sample was finally annealed under very pure argon at 150° C.

EXAMPLE 5

Lithium iodide and lithium nitride (mole ratio 2:1) were comminuted and mixed together in a stainless steel ball mill. Under an atmosphere of nitrogen and argon, the mixture was slowly heated in a molybdenum crucible to 630° C. After annealing for 2 hours, a melt was formed of $Li_5NI_2$ from which, upon cooling, a dense crystal mass resulted which can easily be sawn up into discs, tablets or blocks.

EXAMPLE 6

On a porous ceramic, for example aluminium oxide, or on graphite felt, there were produced thin, dense layers of $Li_5NI_2$ when these, after briefly dipping into a $Li_5NI_2$ melt, were slowly cooled (about 100° C./hour).

It will be understood that the specification and examples are illustrative, but not limitative of the present invention and that other embodiments within the spirit and scope of the invention will suggest themselves to those skilled in the art.

What is claimed is:

1. Ion conductor material based on lithium or sodium compounds of the formula $$A_{3u+2v+w}X_uY_vZ_w$$

wherein
- A is lithium or sodium
- X is nitrogen, phosphorus or arsenic
- Y is nitrogen, sulphur, tellurium or selenium
- Z is hydrogen or fluorine, chlorine, bromine and iodine; and
- u, v, and w each represent a number of from 0 to 1 inclusive, with the proviso that only one of u, v and w can be 0.

2. Ion conductor material as claimed in claim 1 containing compounds of the formula $$Li_{4-x}NHal_{1-x}, 0 \leq x \leq 1.$$

3. Ion conductor material as claimed in claim 1 containing compounds of the formula $$Li_{4-3x}N_{1-x}Hal, 0 \leq x \leq 1.$$

4. A galvanic cell comprising at least one ion conductor material as claimed in claim 1.

* * * * *